US006663328B2

(12) United States Patent
Schmidt et al.

(10) Patent No.: US 6,663,328 B2
(45) Date of Patent: Dec. 16, 2003

(54) UTILITY CART LOAD BINDER

(76) Inventors: Gail E. Schmidt, 600 Tiffany Blvd., Suite H, Rocky Mount, NC (US) 27804; Christopher K. Schmidt, 600 Tiffany Blvd., Suite H, Rocky Mount, NC (US) 27804

( * ) Notice: Subject to any disclaimer, the term of this patent is extended or adjusted under 35 U.S.C. 154(b) by 0 days.

(21) Appl. No.: 09/985,535

(22) Filed: Nov. 5, 2001

(65) Prior Publication Data
US 2002/0054803 A1 May 9, 2002

Related U.S. Application Data
(60) Provisional application No. 60/246,064, filed on Nov. 6, 2000.

(51) Int. Cl.[7] .................................................. B60P 7/08
(52) U.S. Cl. .............................. 410/97; 410/96; 410/34; 410/51
(58) Field of Search .............................. 410/32, 34, 96, 410/97, 100, 116, 118, 51; 248/499; 24/298, 300; 280/47.31, 653

(56) References Cited

U.S. PATENT DOCUMENTS

| 518,207 A | * | 4/1894 | Cassaday et al. .............. 410/34 |
| 578,855 A | * | 3/1897 | Bradley ........................ 410/100 |
| 2,895,430 A | * | 7/1959 | Dunlap ........................ 410/116 |
| 3,796,404 A | | 3/1974 | Shields |
| 4,011,974 A | | 3/1977 | Scarola |
| 4,645,225 A | | 2/1987 | Eubanks |
| 4,842,236 A | | 6/1989 | Yonts |
| 4,900,204 A | | 2/1990 | Summers ..................... 410/97 |
| 5,035,558 A | * | 7/1991 | Prosen ........................ 410/96 |
| 5,137,403 A | * | 8/1992 | McCaffrey .................... 410/51 |
| 5,346,232 A | | 9/1994 | Bushon |
| 5,366,327 A | | 11/1994 | Nelson ........................ 410/96 |
| 5,519,921 A | | 5/1996 | Templer, Jr. |
| 5,553,981 A | | 9/1996 | Braden ........................ 410/116 |
| 5,618,140 A | | 4/1997 | Okland ........................ 410/106 |
| 5,806,866 A | | 9/1998 | Fleischer |
| 5,839,772 A | | 11/1998 | Toole |
| 5,876,167 A | * | 3/1999 | Selby ........................... 410/97 |
| 5,888,040 A | | 3/1999 | Walsh et al. ................. 410/100 |
| 5,915,900 A | * | 6/1999 | Boltz ........................... 410/110 |
| 6,017,174 A | | 1/2000 | Ross et al. ................... 410/100 |
| 6,152,664 A | * | 11/2000 | Dew et al. ................... 410/100 |
| 6,273,654 B1 | * | 8/2001 | Whitaker ..................... 410/116 |
| 6,419,433 B1 | * | 7/2002 | Chou ........................... 410/97 |
| 6,439,815 B1 | * | 8/2002 | Liu ............................. 410/106 |

FOREIGN PATENT DOCUMENTS

| GB | 2167354 | 5/1986 |
| JP | 9-118165 | 5/1997 |
| JP | 9-193707 | 7/1997 |

* cited by examiner

Primary Examiner—Stephen T. Gordon
(74) Attorney, Agent, or Firm—Richard C. Litman

(57) ABSTRACT

Various embodiments of a utility cart load binder provide for positively securing a load in or to a utility cart, such as a garden cart, wheelbarrow, etc. Each embodiment includes a series of preferably four cords or lines, with each having a cart attachment end and an opposite load securing end. The cart attachment ends of the lines are removably or permanently secured to the upper portion of the side walls of the cart, where they may be extended to a point above the center of the load contained in the cart. A generally central binder attachment fitting (ring, tarp or the like, etc.) is positioned atop the load, with each of the lines then being removably and adjustably attached to the fitting. The lines may comprise elastic bungee cords, or inelastic material as desired, with various cart side wall attachment systems being provided.

13 Claims, 6 Drawing Sheets

UTILITY CART LOAD BINDER

REFERENCE TO RELATED PATENT APPLICATION

This application claims the benefit of U.S. Provisional Patent Application Ser. No. 60/246,064 filed on Nov. 6, 2000.

BACKGROUND OF THE INVENTION

1. Field of the Invention

The present invention relates generally to devices for securing articles or material in or upon a conveyance or vehicle for transport, and more specifically comprises various embodiments of a device which may be removably or permanently secured to the upper side walls of a utility cart (garden cart, wheelbarrow, etc.), and which may be extended across the cart body or bin to secure a load therein. The present binder comprises a series of elastic or non-elastic lines, all of which removably connect to a central attachment positioned atop the general center of the load.

2. Description of the Related Art

Relatively small, lightweight, unpowered utility carts (e.g., pony carts, etc.) capable of being pulled and/or maneuvered by a single person, have been known since the earliest of times. While the use of such carts has been largely supplanted by more modern technology in day to day life, such devices are still practical for use in general yard work, gardening, and similar activities.

Such small, unpowered utility carts have a variety of different configurations, from the small, two or four wheeled utility trailer having a hitch for towing behind a riding mower, garden tractor, or the like, to wheelbarrows with their single forward wheel and two rearwardly disposed legs for supporting the wheelbarrow at rest. A number of additional related configurations are known, but the key point that such utility vehicles possess universally, is that they all have a load carrying body or bin with side walls and an open top. The present load binder invention is adaptable to any light cart or similar device having such a configuration, with the term "utility cart" as used in the present disclosure encompassing all such vehicles and devices having such an open top bin configuration.

The open top of such carts and the like provides numerous benefits, e.g., simplified loading and unloading, less restriction of load capacity, economy of purchase and operation, relatively lower maintenance and greater durability than would be the case with a device having a movable top, etc. However, such convenience is not without its drawbacks. The lack of a top over the open bin of such carts, creates an additional difficulty in securing a load within the bin. While this may not be a significant problem in certain limited circumstances (e.g., relatively small but dense loads carried in a stable cart over smooth and level surfaces), it often results in difficulties in many instances, as when maneuvering a relatively unstable wheelbarrow having a high load stacked therein, over rough and/or uneven terrain.

Nearly everyone has experienced the frustration which occurs after loading a wheelbarrow or similar appliance, and then losing a good percentage or perhaps all of the load as the wheelbarrow is inadvertently tipped for some reason. The instability of the single forward wheel, when combined with the high center of gravity of a tall and heavy load, make the wheelbarrow a most difficult device to use efficiently. Even with lighter loads, it can be difficult to secure such cargo positively even in more stable carts, where the cargo or load comprises very lightweight materials which are subject to blowing away in the wind. The problem is exacerbated with such lightweight materials, as there is a tendency to stack such materials well above the height of the upper edges of the bin walls in order to transport as large a load as possible.

Accordingly, a need will be seen for a device for temporarily securing a load within a utility cart or similar device or appliance. The present invention provides a load binder for such utility carts and the like, comprising a series of ties, cords, or the like which are removably or permanently secured adjacent the upper edge of the opposite side walls of the load carrying bin of the appliance. The ties or cords may be elastic (e.g., bungee cords, etc.), or may be non-elastic, as desired. Each of the cords or lines includes a removable fastener end which secures to an attachment which is generally centrally disposed atop the load. The user quickly and easily connects the lines to the central attachment to secure the load, with disconnection also being easily accomplished when the load is to be removed from the cart.

A discussion of the related art of which the present inventors are aware, and its differences and distinctions from the present invention, is provided below.

U.S. Pat. No. 3,796,404 issued on Mar. 12, 1974 to Charles J. Shields, titled "Apparatus For Alternatively Securing Irregular Cargo And Standard Shipping Containers," describes a deck plate having a cruciform slot therein. The slot may accept either of two attachments, with one comprising an upwardly extending arm to which a tiedown rope or line is secured, and the other comprising a chock for fitting to the conventional receptacle of a standard shipping container. Shields does not disclose any central attachment disposed atop the cargo for connecting a series of separate lines thereto, as provided by the present load binder invention.

U.S. Pat. No. 4,011,974 issued on Mar. 15, 1977 to Dominick F. Scarola, titled "Vehicle Cargo Strap," describes an assembly comprising a flexible line having a guarded hook at one end and a threaded adjuster mechanism at the opposite end. The hook is secured to one side of the vehicle (e.g., to a rain gutter, etc.), the line is passed over the cargo atop the vehicle, and the adjuster is secured to the opposite side of the vehicle. The adjuster is then tightened to tighten the line across the cargo and vehicle roof. Scarola provides a single unbroken line which extends from one side of the vehicle to the other, with the adjuster at one end thereof. In contrast, the present load binder comprises a series of shorter lines, which removably and adjustably attach to a fitting disposed across the upper center of the load.

U.S. Pat. No. 4,645,225 issued on Feb. 24, 1987 to Mack W. Eubanks, titled "Wheelbarrow Enlargement Insert," describes a multi-piece insert for removable installation within the bin or body of a wheelbarrow. The Eubanks device essentially comprises a solid shell which fits within the wheelbarrow and extends upwardly and outwardly therefrom, to provide a larger volume. Eubanks correctly notes the utility of such a device for carrying cargo having relatively low density (e.g., dry leaves, etc.). However, he is silent regarding any means for securing such a load within the load carrying body of the wheelbarrow itself, or within his insert. In contrast, the present load binder secures across the load, to secure the load positively within the wheelbarrow or cart.

U.S. Pat. No. 4,842,236 issued on Jun. 27, 1989 to James T. Yonts, titled "Spring-Loaded Tiedown Apparatus For Boats, Campers And Other Cargo," describes a cargo strap having a fixed hook at one end and a tension spring at the opposite end. The spring applies an essentially constant tension to the load, in combination with the non-elastic tiedown strap. While Yonts provides an adjuster essentially in the center of his strap, over the top of the load, the Yonts strap is a single, continuous length between the hook at one end and the spring at the opposite end. It is not possible to disconnect the hook and strap ends of the Yonts strap from one another across the center of their span, whereas the multiple straps of the present load binder removably secure to one another at the general center across the top of the load.

U.S. Pat. No. 4,900,204 issued on Feb. 13, 1990 to Robert M. Summers, titled "Elastic Spider Web Cargo Restraint Devices," describes a cargo net comprising a series of radial and concentric elastic cords, having a configuration resembling that of a conventional spider web. The radial cords all attach at their mutual center ends to a steel ring, plate, or other central attachment. However, the Summers net differs from the present load binder in that Summers provides attachment and adjustment only at the outer periphery of his net assembly. The inner ends of the radial elements are all permanently affixed to the central element, with Summers making no disclosure of any means for removing the central ends from the central component. In contrast, the present load binder may secure permanently to the sides of the utility cart, wheelbarrow, etc., with the central ends all being removably and adjustably attached to the central component atop the load.

U.S. Pat. No. 5,346,232 issued on Sep. 13, 1994 to Richard J. Bushon, titled "Wheelbarrow Power Strap," describes an assist strap which extends laterally across the handlebars, immediately forwardly of the hand grips. The operator of the wheelbarrow may apply pressure with one upper leg, to assist in pushing the wheelbarrow forward over uneven surfaces, lifting the rear of the wheelbarrow to dump a load, etc. However, the Bushon assist strap does not extend across the cargo or load carrying area, and does nothing to secure the load within that area of the wheelbarrow, as does the present load binder invention.

U.S. Pat. No. 5,366,327 issued on Nov. 22, 1994 to Bergen Nelson, titled "Tiedown Hitch," describes a rope attachment for installation generally along the center of a single, continuous length of rope or line. One end of the rope is secured to a tiedown point at one side of the load, and the hitch attachment is secured immovably along the rope. The free end of the rope is passed from the hitch to a second tiedown point, around that point, and back to the hitch where it is wrapped about a hook. This results in multiple lengths of line to one side, providing the user with a mechanical advantage similar to the block and tackle principle. However, the rope used with the Nelson device is still a single, unbroken length, with the Nelson hitch being unable to provide for the removable and adjustable attachment of two ropes or lines thereto, unlike the present load binder with its adjustable central attachment.

U.S. Pat. No. 5,519,921 issued on May 28, 1996 to Joe L. Templer, Jr., titled "Mobile Rope Cleat," describes a cleat or hitch block having a series of oppositely facing catches on each side thereof, for securing a rope or line therein in a sinusoidal path to preclude slippage. The Templer, Jr. device is somewhat different structurally from the device of the Nelson '327 U.S. Patent discussed immediately above, but performs essentially the same function. The differences noted above in the discussion of the Nelson device, e.g., the lack of any adjustable central attachment for two or more ropes or lines, as provided by the present invention, are seen to apply here as well.

U.S. Pat. No. 5,553,981 issued on Sep. 10, 1996 to Leon T. Braden, titled "Cargo Holder," describes a flat metal bar having a hook at each end. A pliable sleeve is installed along the body of the bar, and is used to wedge the bar in place temporarily during installation and also to protect the finish of the vehicle when the bar is installed thereon. Braden does not disclose any specific arrangement for securing a rope or line to his holder, nor any specific means for adjusting the length or tension of the line.

U.S. Pat. No. 5,618,140 issued on Apr. 8, 1997 to Merlyn C. Okland, titled "Tie Down Device," describes a side rail bar which is removably installed to the stake pockets in the side wall of a pickup truck or the like. The end components each include a passage therethrough, for securing a rope or the like to the device for securing cargo in the bed of the pickup truck. Okland is silent regarding any means of adjusting the length(s) of any rope(s) or line(s) secured to his device, and does not disclose any central attach point disposed atop the cargo or load.

U.S. Pat. No. 5,806,866 issued on Sep. 15, 1998 to Jeff Fleischer, titled "Cargo Enhancing Method And Apparatus," describes a pair of fences which are removably installed to the sides of a wheelbarrow. The fences each include hooks or catches which fit over the upper edges of the wheelbarrow side walls, and lower extensions which are secured by bungee cords or the like which hook together beneath the wheelbarrow. However, Fleischer does not disclose any form of binder which would extend across the wheelbarrow bin or his fences, to secure a load positively therein.

U.S. Pat. No. 5,839,772 issued on Nov. 24, 1998 to Bruce B. Toole, titled "Carrying Bin Wall Extender," describes an assembly somewhat similar to that described in the Fleischer '866 U.S. Patent, discussed immediately above. Toole permanently attaches a series of frames to the side walls and ends of a wheelbarrow, with the frames extending upwardly above the side walls. A fabric mesh or screen extends across the frames to confine a load therebetween. The forward frame components can be opened to allow the contents of the wheelbarrow to be dumped, and to facilitate loading. As in the Fleischer '866 U.S. Patent discussed above, Toole fails to provide any means for securing a load positively within the wheelbarrow or his wall extensions, whereas the present invention is directed to a series of load binder cords or lines either removably or permanently secured to the side walls of a wheelbarrow or cart, which adjustably and removably secure to a central attachment point disposed atop the load.

U.S. Pat. No. 5,888,040 issued on Mar. 30, 1999 to Martin Walsh et al., titled "Cargo Restraint Attachment Assembly," describes a track installed along the edges of a flat bed trailer, for adjustably accepting one or more tiedown winches therealong. The winches and tiedown straps are conventional, with no disclosure being made of any interconnection between straps atop the general center of the load, as provided by the present load binder invention.

U.S. Pat. No. 6,017,174 issued on Jan. 25, 2000 to Douglas J. Ross et al., titled "Cargo Retaining Device," describes a cargo net having a peripheral adjusting rope. The rope is tightened to pull the net securely over the cargo, and hooked to appropriate points on the vehicle. In contrast, the present load binder comprises a series of separate, generally radially disposed lines when they are installed. They may be permanently secured to the upper portions of the cart side walls and adjustably and removably secure to a single central point atop the load.

British Patent Publication No. 2,167,354 published on May 29, 1986 to Fruehauf Corporation, titled "Cargo Tiedown Device," describes a series of channels set into the floor or wall of a cargo area, with a series of bolts or rods extending laterally across each of the channels. The tiedown ropes, lines, hooks, etc. are passed beneath the bolts or rods and secured thereto. No actual rope or line configuration is disclosed in the 1354 British Patent Publication.

Japanese Patent Publication No. 9-118,165 published on May 6, 1997 describes (according to the drawings and English abstract) a triangular cargo net which hooks to the underside of a vehicle seat and to an adjacent shoulder harness anchor. The third corner of the net is removably secured to the conventional seat belt anchor as desired for use. As in the other cargo securing devices known to the present inventors, no disclosure is apparent in the '165 Japanese Patent Publication of any separate lines or cords removably attaching to a single central point atop the load.

Finally, Japanese Patent Publication No. 9-193,707 published on Jul. 29, 1997 describes (according to the drawings and English abstract) a ropeless system utilizing a series of locator blocks for precisely positioning a standard cargo box or platform, with a series of hydraulically rotatable chocks selectively engaging corresponding recesses in the lower edge of the cargo box or platform. As no ropes or lines are used, the system of the '707 Japanese Patent Publication does not relate to the present invention, with its multiple tiedown lines which removably and adjustably connect to a single central point atop the load.

None of the above inventions and patents, taken either singularly or in combination, is seen to describe the instant invention as claimed. Thus a utility cart load binder solving the aforementioned problems is desired.

SUMMARY OF THE INVENTION

The present invention comprises various embodiments of a load binder or securing device, for use with wheelbarrows and other related utility carts used in gardening, construction, etc. The present load binder comprises a series of at least two, and preferably four, elastic or inelastic cords or lines, each having a cart attachment end and an opposite load securing end. The cart attachment ends are either permanently or removably affixed to the upper portion of the side walls of the cart, while the opposite load securing ends removably and adjustably attach to a generally central attachment device positioned atop the load.

Accordingly, it is a principal object of the invention to provide a load binder apparatus for use in positively securing a load to or within a utility cart (wheelbarrow, garden cart, etc.), and a method of use for such an apparatus.

It is another object of the invention to provide such a load binder comprising a series of two or more elastic or inelastic lines, each having a cart attachment end and an opposite load securing end, with each cart attachment end being permanently or removably secured to the upper portion of the side wall of the cart.

It is a further object of the invention to provide an attachment fitting which is positioned generally centrally atop the load, with the load securing end of each of the lines removably and adjustably attaching to the central attachment fitting.

Still another object of the invention is to provide an attachment fitting comprising a ring or alternatively comprising a tarp to which the load securing ends of the lines may be removably and adjustably attached.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
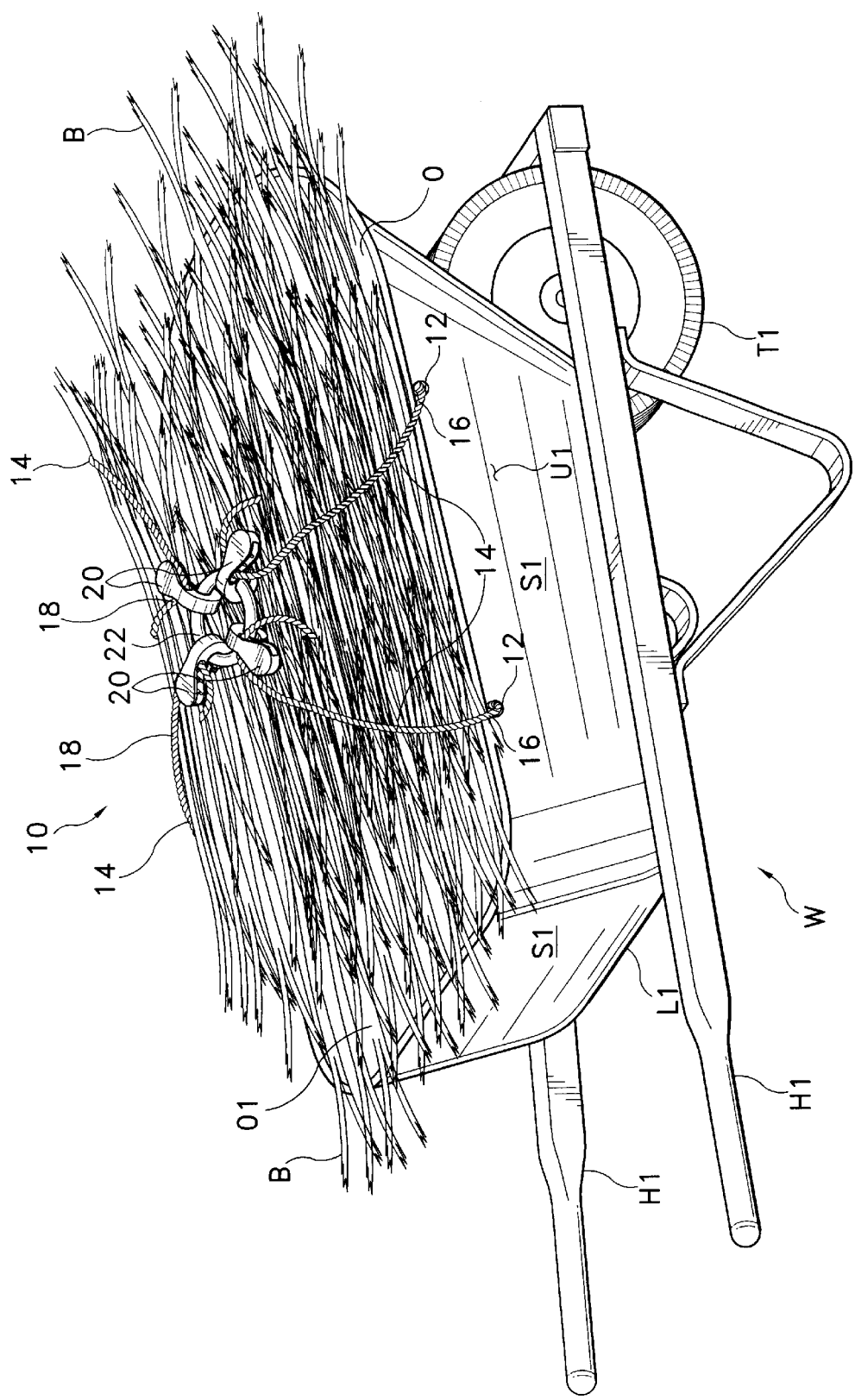
FIG. 1 is an environmental perspective view of a first embodiment of the present load binder, shown securing a load to a wheelbarrow.

The present invention comprises various embodiments of a load binder for removably securing a load to a utility cart. FIG. 1 of the drawings illustrates a first embodiment of the present invention, wherein the load binder assembly 10 is used to secure a load of branches B within a wheelbarrow W. The wheelbarrow W has a single forwardly disposed wheel or tire T1 and a pair of rearwardly disposed frame members and handles H1 and H2 which support a load bin L1. The bin L1 includes a surrounding side wall S1 having an upper edge portion U1, with an open top O1, as is conventional in such carts or devices. However, the upper portion U1 of the side wall S1 includes a series of line attachment means disposed thereon or therethrough, providing for attachment of the load securing lines of the present load binder invention. In the case of the embodiment of FIGS. 1, 4, and 5, the line attachment means comprise a series of holes or passages 12 formed through the upper portion U1 of the side wall S1 of the load bin L1.

The present load binder assembly 10 includes a series of essentially identical elongate, flexible load securing lines 14, each having a side wall attachment end 16 and an opposite load securing end portion 18. The load securing lines 14 are preferably formed of lengths of resilient elastic material, such as bungee cords, but may alternatively be formed of inelastic materials (rope, flexible cable, etc.) if so desired. The lines 14 are equal in number to the number of line attachment means (e.g., passages 12) along the side wall S1 of the load bin L1 of the wheelbarrow W.

The load securing end 18 of each of the lines 14 is removably and adjustably secured to a load securing hook 20, with the hooks in turn being removably secured to a single line attachment fitting which is generally centrally positioned atop the load, e.g., the branches B. The central line attachment fitting may comprise a circular metal ring 22, as shown in FIGS. 1 and 3, or may alternatively comprise some other structure, such as the small tarp illustrated in the alternate embodiment of FIG. 2.

Figure 3:
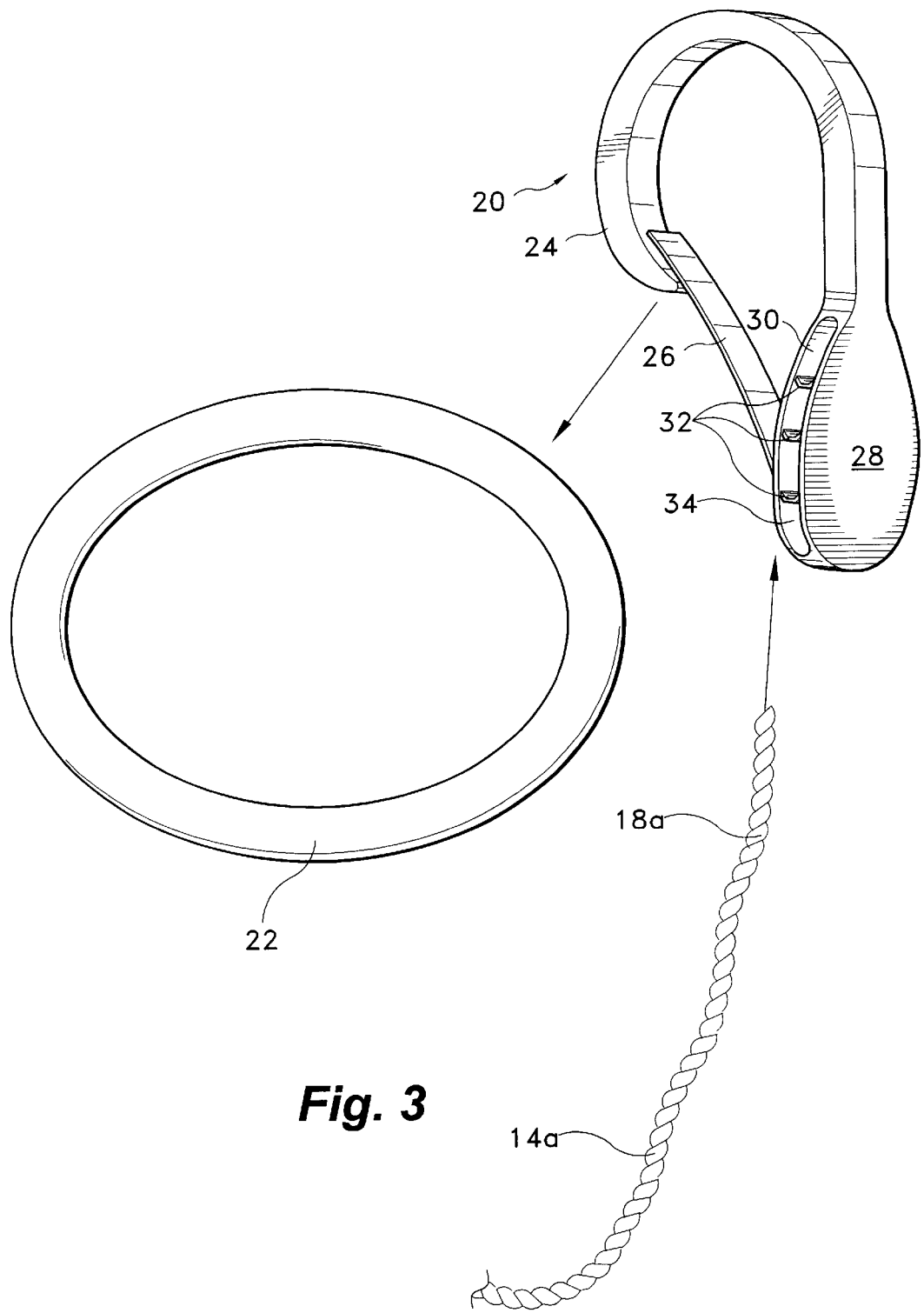
FIG. 3 is a detailed exploded perspective view showing a removable and adjustable attachment component for securing the load securing end of a line to a central attachment fixture or ring.

FIG. 3 provides a detailed view of one of the load securing hooks 20 and the load securing ring 22, and means for removably securing the hook 20 to the ring 22 and for securing the load securing end 18a of an inelastic rope line 14a to the hook 20. The hook 20 is a conventional device which may be purchased as an off the shelf component at many hardware stores and home improvement centers. The hook 20 is laterally symmetrical, with a hook portion 24 and guard 26 extending from an attachment body portion 28. The body 28 includes a passage 30 therethrough at the hook extension end thereof. A series of line engaging teeth 32 are provided in slots 34 to each side of the body portion 24. The hook 20 is secured to the ring 22 or other line attachment fitting, the rope or line 14, 14a, etc. is inserted through the passage 30 and pulled taut as desired, and pushed into the slots 34, whereupon the teeth 32 grip the rope or line 14, 14a, particularly the otherwise free end thereof, to preclude its pulling back through the hook passage 30. Other types of hooks, e.g., swivel snap hooks, etc., may be used alternatively as desired.

Figure 4:
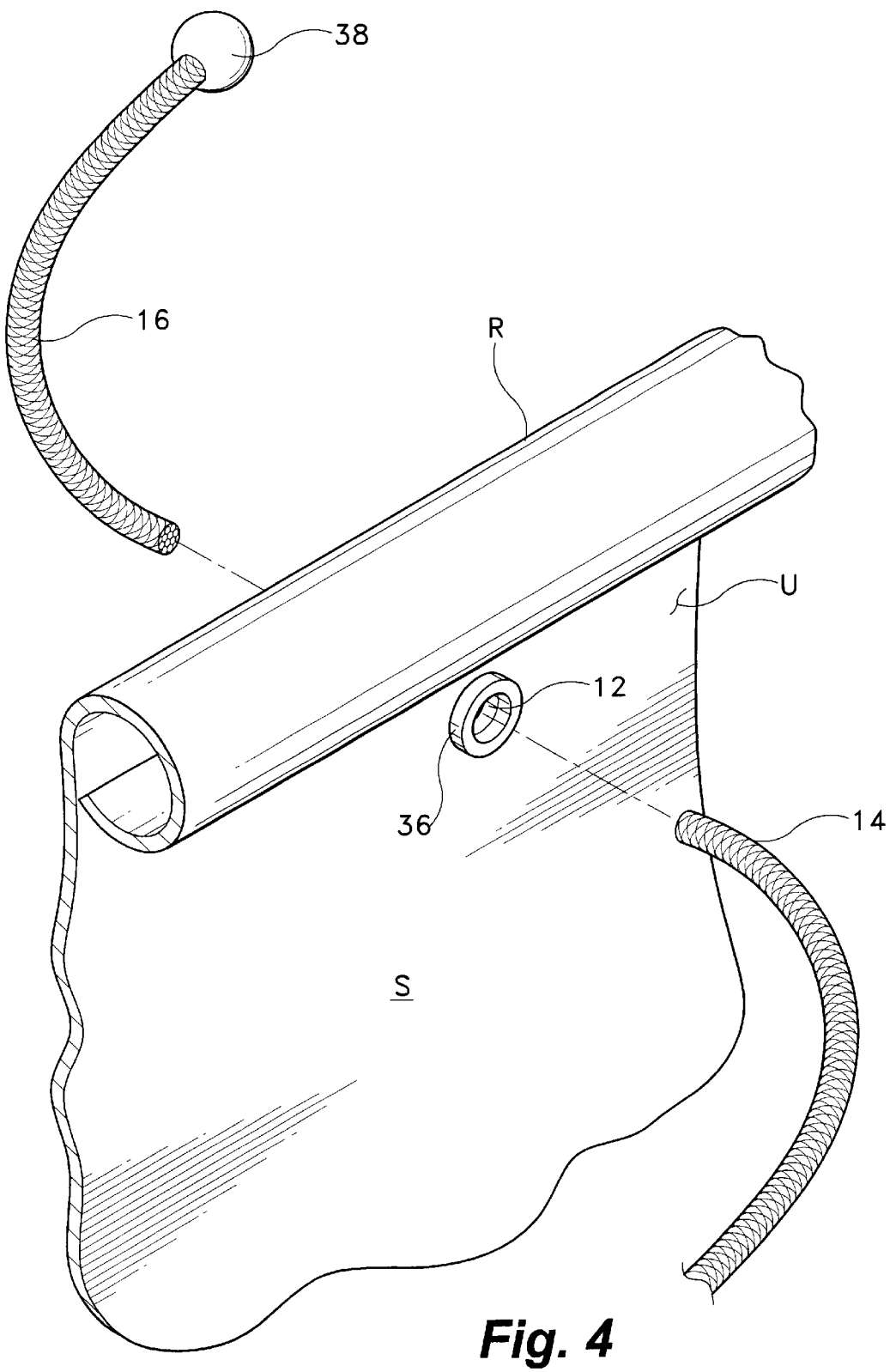
FIG. 4 is a detailed exploded perspective view showing the attachment of a load securing line to the side wall of a utility cart, in accordance with the first embodiment of the invention.

FIG. 4 provides a detailed illustration of the line attachment means of the embodiment of FIG. 1, for securing the line 14 to the side wall of the cart. In FIG. 4, the side wall is designated more generally by the letter S, rather than S1, and the upper portion thereof is designated generally as U, rather than U1. It will be seen that the same principle is adaptable to any of the various types of carts with which the present invention may be used, such as the wheelbarrow W of FIG. 1 with its side wall S1, the garden cart C of FIG. 2 with its side wall S2, etc.

The hole or line passage 12 formed through the side wall S of the bin is used to capture the load securing end 16 of the line 14 therein, to preclude passage of the line 14 through the hole 12. A grommet 36 or other protective means may be installed about the periphery of the hole or passage 12 as desired, to protect the line 14 from chafing, cutting, and/or fraying on the edge of the hole 12. The line 14 is conventionally provided with a protuberance 38 formed on one end thereof. As the protuberance 38 (e.g., a plastic ball secured in place on the end of the line 14, etc.) is of a larger diameter than the diameter of the passage 12, the protuberance 38 is captured behind the hole 12 and cannot pass therethrough. The side wall attachment end 16 of the line 14 is thus captured by the side wall S, allowing the line 14 to be pulled taut to secure the load within the bin of the cart (e.g., wheelbarrow W of FIG. 1, garden cart C of FIG. 2, etc.).

Figure 2:
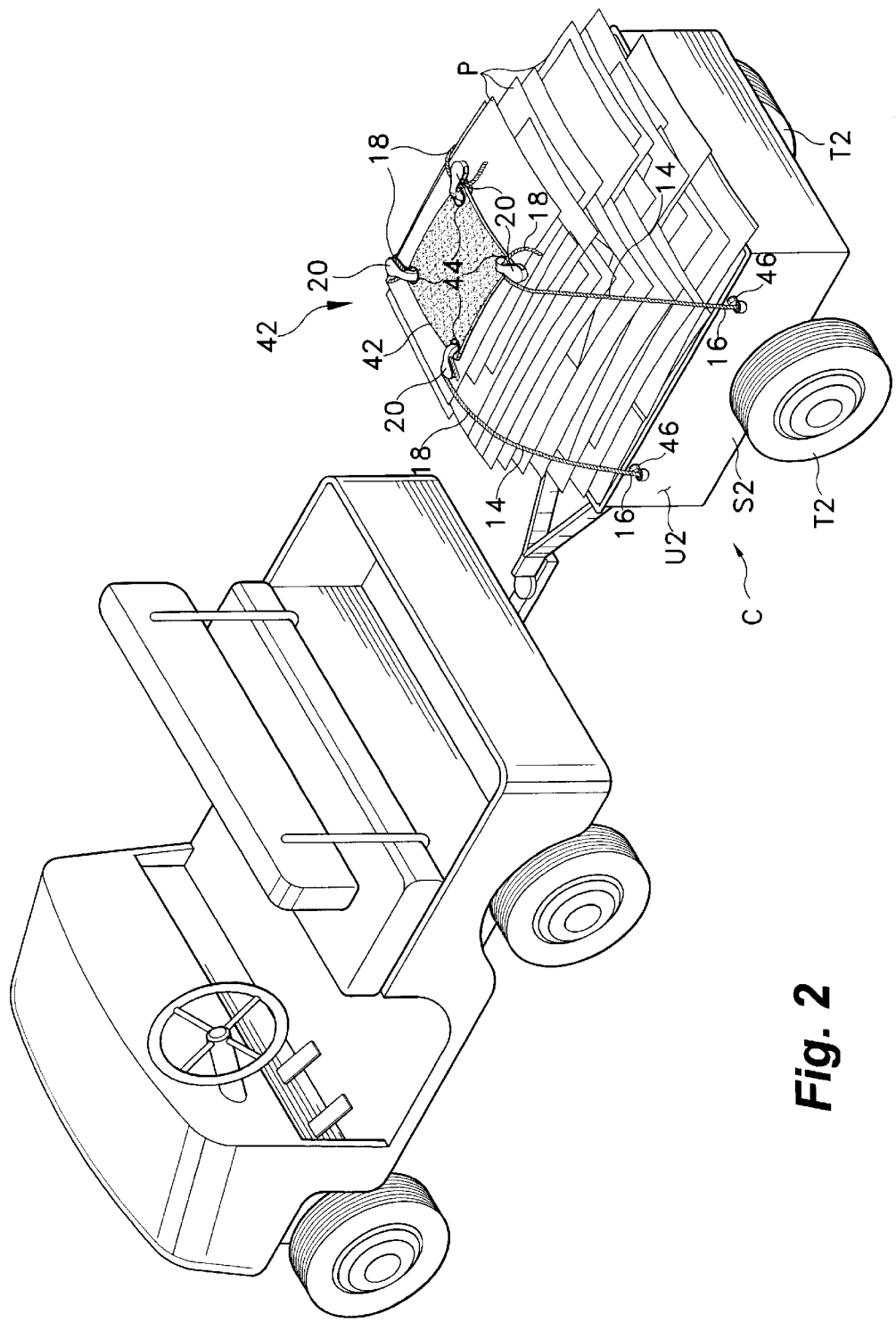
FIG. 2 is an environmental perspective view of an alternative embodiment of the present load binder including a central tarp, shown securing a load to a utility cart.

As noted further above, the present load binder invention may be used with virtually any type of small cart having a load bin with an open top. FIG. 2 illustrates a somewhat different embodiment of the present invention, installed upon a conventional garden cart C. Such carts C are typically equipped with a pair of laterally disposed wheels or tires T2, with a lateral axle or frame (not shown) which supports a load bin thereon. The load bin is surrounded by side walls S2 having an upper edge portion U2 to which the present load binder invention may be removably secured, somewhat as shown with the wheelbarrow W of FIG. 1.

The load binder assembly 40 of FIG. 4 differs somewhat from the assembly 10 of FIG. 1, primarily in that the line attachment fitting disposed generally over the center of the load, comprises a small tarp or sheet 42. The tarp 42 includes a series of peripheral holes or grommets 44 formed therethrough, through which the hooks of the hook assemblies 20 may be removably hooked as desired. The lines 14 are tightened through the bodies 28 of the hooks 20 in the same manner as that described above in describing the assembly 10 of FIG. 1. The connection of the hooks to the eyelets or grommets 44 of the tarp 42 will be seen to be essentially the same procedure as that used in connecting the hooks to the single ring 22 illustrated in FIGS. 1 and 2 of the drawings. The tarp 42 is particularly valuable in securing loads which may be more subject to dispersal by the wind, such as a stack of paper P, cardboard, or perhaps leaves or other lightweight sheets of material, generally as shown in FIG. 4 of the drawings.

Figure 5:
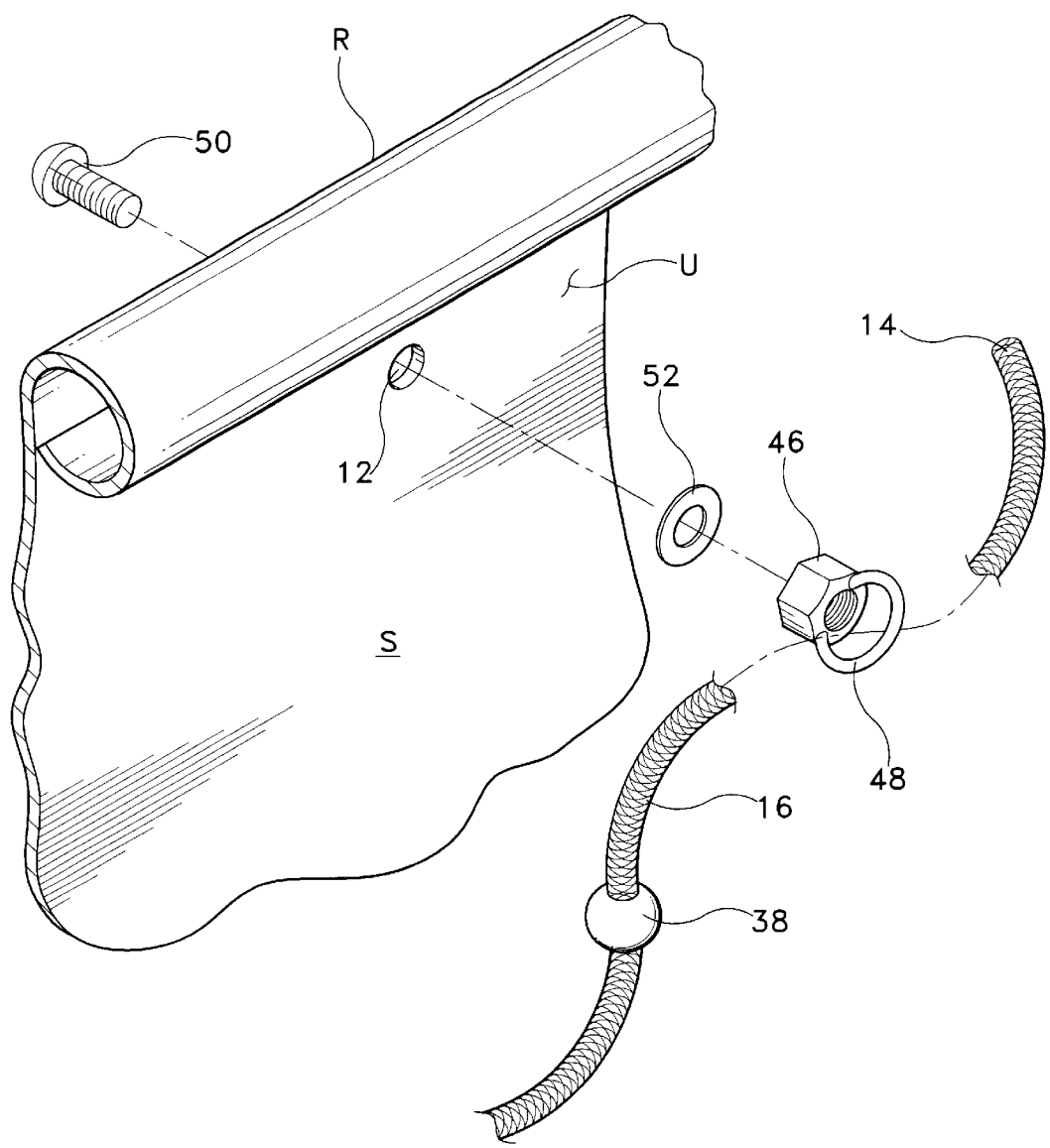
FIG. 5 is a detailed exploded perspective view showing an alternative means of attaching a load securing line to the side wall of a utility cart.

The cart attachment fittings of the assembly 40 of FIG. 2 differ somewhat from those of the assembly 10 of FIG. 1, in that the fittings of FIG. 2 comprise a series of threaded fasteners 46 each having an eye 48 formed therethrough or therewith. A more detailed view of this arrangement is illustrated in FIG. 5. In FIG. 5, the upper edge portion U of the side wall S (e.g., the side wall S1 of the wheelbarrow W of FIG. 1, the side wall S2 of the cart C of FIG. 2, or the side wall of another type of utility cart) includes a hole or passage 12 formed therethrough, in the manner of the side wall S of FIG. 4. However, rather than passing the side wall attachment end 16 of the line 14 through the hole 12, a bolt 50 is inserted through the hole from the inside of the wall S, with an eye nut 46 secured to the threaded end of the bolt 50 on the opposite outside of the wall S. A conventional washer 52 may be installed between the nut 46 and sidewall S, and/or between the head of the bolt 50 and the sidewall S, as desired.

The eye nut 46 includes an eye loop 48 extending therefrom, which serves as a passage for the cart attachment end 16 of the line 14. The protuberance or stop ball 38 disposed on (or near) the side wall attachment end 16 of the line 14, is larger than the internal diameter of the eye loop 48. Thus, the ball 38 is captured by the eye 48, and cannot pass through the eye 48. This secures the side wall attachment end 16 of the line 14 relative to the side wall S, allowing the line 14 to be secured to the central fitting (ring 22 or tarp 42) and tightened, as described further above.

Figure 6:
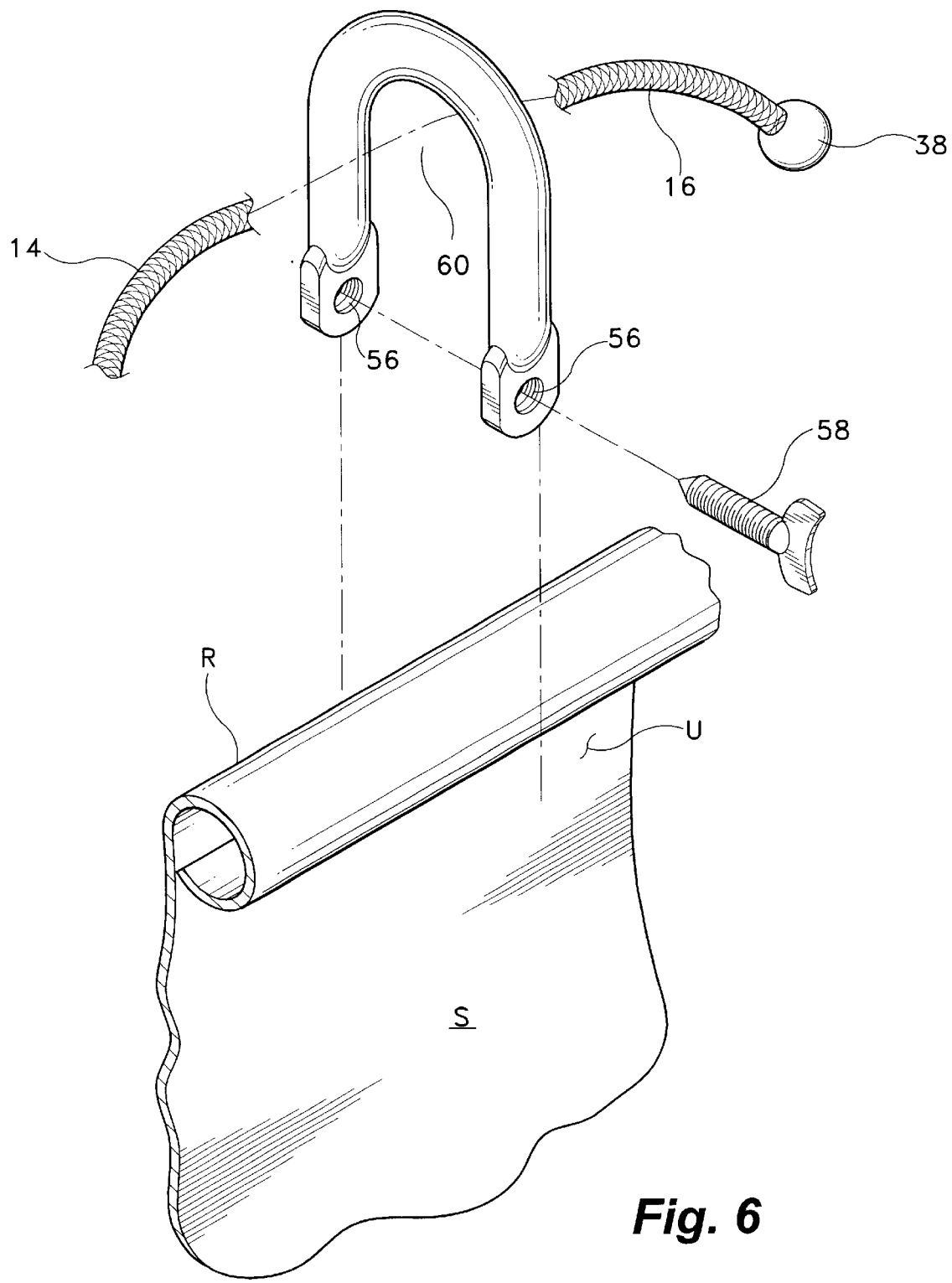
FIG. 6 is a detailed exploded perspective view showing another alternative means of attaching a line to the side wall of a cart, obviating any need for drilling or forming holes through the side wall.

FIG. 6 illustrates yet another means for securing the side wall attachment end 16 of the line 14 to the upper edge portion U of the side wall S of a utility cart. Rather than drilling holes through the upper edge portion U of the sidewall S of FIG. 5, a shackle or clevis 54 is secured thereto. Utility carts (garden carts, wheelbarrows, etc.) are conventionally constructed with a flange along the upper edge of the load bin. This upper edge may be rolled, as shown by the rolled upper edge R in FIGS. 4 through 6, or may be in the form of an L-shaped bend, multiple bends forming a rectangular cross section, etc. The critical point is only that there is some widening of the upper edge, with the widened upper edge of the cart bin serving as a stop to preclude slippage of an attachment to the upper portion U of the wall S.

In FIG. 6, the shackle 54 has a threaded hole 56 at each side or end thereof. (A series of such shackles 54 are actually used, with one shackle 54 for each line 14.) Only a single threaded passage 56 is required, as the bolt 58 (e.g., wing bolt, etc.) passes through only one side to clamp the upper edge portion U of the side wall S between the tip of the bolt 58 and the opposite leg of the shackle 54. The U shaped upper portion of the shackle 54 and the rolled (or otherwise formed) upper edge R of the side wall S, define an attachment passage 60 therebetween, for the insertion of the line 14 therethrough. As in the other embodiments, the protuberance 38 on the side wall attachment end 16 of the line 14 is too large to pass through the passage defined by the shackle 54 and side wall edge R, thereby holding the line end 16 in place.

In conclusion, the present utility cart load binder embodiments provide a much needed means for quickly and easily securing a load of loose material onto or within a wheelbarrow, garden cart, or other similar utility conveyance. While certain of the embodiments require a series of holes to be drilled or formed through the upper side walls of the cart, another embodiment provides for the side wall attachment ends of the load securing lines to be clamped indirectly to the edges of the side walls, with no modification of the cart being required. The novel system of removably attaching all of the load securing lines to a single, generally centrally disposed attachment positioned atop the load, greatly facilitates the use of the present load binder embodiments.

The present load binder in any of its various embodiments is useful in securing a wide variety of different loads, from sticks, twigs, and branches, to loose paper and cardboard sheets, leaves, etc., and is also valuable in securing other elongate articles (e.g., shovels, rakes, hoes, and other garden tools) in the relatively low and sloped bin of a wheelbarrow or the like. As a result, the present load binder will find great favor among those who have occasion to carry loads of various types in wheelbarrows and other forms of utility and garden carts.

It is to be understood that the present invention is not limited to the embodiments described above, but encompasses any and all embodiments within the scope of the following claims.

We claim:

1. A load binder for a utility cart, with the cart having at least a load bin with a surrounding side wall and open top, the invention comprising:
    a plurality of flexible, elongate load securing lines, each said line having a side wall attachment end and a load securing end opposite said side wall attachment end;
    line attachment means for attaching the side wall attachment end of each said load securing line to the side wall of the cart;
    a plurality of load securing hooks corresponding in number to said plurality of load securing lines, with one of said hooks being removably and adjustably secured to said load securing end of each of said load securing lines; and
    a single, generally centrally disposed line attachment fitting for removably attaching each of said hooks thereto, for selectively securing a load within the utility cart as desired.

2. The load binder according to claim 1, wherein each of said load securing lines is formed of an elastic material.

3. The load binder according to claim 1, wherein said line attachment means comprises:
    a protuberance disposed upon said side wall attachment end of each said load securing line; and
    a plurality of grommets adapted for attachment to passages defined through the sidewall of the cart radially about the cart, each protuberance having a greater diameter than each said grommet, whereby when each said load securing line is pulled towards a central point of the load bin, said protuberances prevent the sidewall attachment end of said line from passing through the grommets adapted for attachment to the sidewall of the cart.

4. The load binder according to claim 1, wherein said line attachment means comprises:
    a protuberance disposed upon said side wall attachment end of each said load securing line; and
    a plurality of eye nuts adapted for attachment to the sidewall of the cart radially about the cart, each protuberance having a greater diameter than each eye of a respective one of said eye nuts, whereby when each said load securing line is pulled towards a central point of the load bin, said protuberances prevent the sidewall attachment end of said line from passing through the eyes adapted for attachment to the sidewall of the cart.

5. The load binder according to claim 1, wherein said line attachment means comprises:
    a plurality of generally U-shaped shackles removably secured to the side wall of the cart, each of said shackles defining a line passage disposed between each one of said shackles and the side wall of the cart; and
    a protuberance disposed upon the side wall attachment end of each said load securing line, each protuberance having a diameter greater than said line passage, whereby each said protuberance is prevented from passing through said line passage when tension is applied to each said load securing line.

6. The load binder according to claim 1, wherein said line attachment fitting is selected from the group consisting of a metal ring and a tarp having a periphery with a plurality of hook attachment holes formed therethrough.

7. A utility cart and load binder therefor, comprising in combination:
    a wheeled cart including a load bin having a surrounding side wall with an upper edge portion, and an open top;
    a plurality of flexible, elongate load securing lines, each having a side wall attachment end and a load securing end opposite said side wall attachment end;
    line attachment means disposed radially about said cart for attaching the side wall attachment end of each said load securing line to the side wall of said cart;
    a plurality of load securing hooks corresponding in number to said plurality of load securing lines, with one of said hooks being removably and adjustably secured to said load securing end of each of said load securing lines; and
    a single, generally centrally disposed line attachment fitting for removably hooking each of said hooks thereto, for selectively securing a load within said load bin of said cart as desired.

8. The utility cart and load binder combination according to claim 7, wherein each of said load securing lines is formed of an elastic material.

9. The utility cart and load binder combination according to claim 7, wherein the sidewall of said cart has a plurality of passages defined therein and wherein said line attachment means comprises:
    a protuberance disposed upon said side wall attachment end of each said load securing line; and
    a plurality of grommets attached to the passages defined through the sidewall of the cart, each protuberance having a greater diameter than each said grommet, whereby when each said load securing line is pulled towards a central point of the load bin, said protuberances prevent the sidewall attachment end of said line from passing through the grommets disposed in the sidewall of the cart.

10. The utility cart and load binder combination according to claim 7, wherein said line attachment means comprises:

a protuberance disposed upon said wall attachment end of each said load securing line and a plurality of eye nuts attached to the sidewall of said cart, each protuberance having a greater diameter than each eye of a respective one of said eye nuts, whereby when each said load securing line is pulled towards a central point of the load bin, said protuberances prevent the sidewall attachment end of said line from passing through the eyes disposed on the sidewall of said cart.

11. The utility cart and load binder combination according to claim 7, wherein said line attachment means comprises:

a plurality of generally U-shaped shackles removably secured to the side wall of the cart, each of said shackles defining a line passage disposed between each one of said shackles and the side wall of the cart; and a protuberance disposed upon the side wall attachment end of each said load securing line, each protuberance having a diameter greater than said line passage, whereby each said protuberance is prevented from passing through said line passage when tension is applied to each said load securing line.

12. The utility cart and load binder combination according to claim 7, wherein said line attachment fitting is selected from the group consisting of a metal ring and a tarp having a periphery with a plurality of hook attachment holes formed therethrough.

13. The utility cart and load binder combination according to claim 7, wherein said wheeled cart is selected from the group consisting of a wheelbarrow and a garden cart.

* * * * *